June 27, 1967 F. J. NEWLAND 3,328,629
TRAVELING WAVE TUBE INCORPORATING AN ELECTROSTATIC FOCUSING
ARRANGEMENT COMPRISING A MEANDER LINE SLOW WAVE STRUCTURE
AND TWO FURTHER ELECTRODES CO-EXTENSIVE THEREWITH
Filed July 9, 1963

INVENTOR
FRANCIS JOHN NEWLAND
BY
ATTORNEYS

United States Patent Office 3,328,629
Patented June 27, 1967

3,328,629
TRAVELING WAVE TUBE INCORPORATING AN ELECTROSTATIC FOCUSING ARRANGEMENT COMPRISING A MEANDER LINE SLOW WAVE STRUCTURE AND TWO FURTHER ELECTRODES CO-EXTENSIVE THEREWITH
Francis John Newland, London, England, assignor to The M-O Valve Company Limited, London, England
Filed July 9, 1963, Ser. No. 293,659
Claims priority, application Great Britain, Aug. 9, 1962, 30,661/62
2 Claims. (Cl. 315—3.5)

This invention relates to travelling wave tubes of the kind disclosed in British patent specification No. 835,350.

In claim 1 of that specification there is claimed: "An electrostatic focussing device including a pair of periodic metal structures disposed with their lengths substantially parallel to each other so as to define between them a space through which an electron beam may travel, the gaps in each structure being disposed opposite the metal elements of the other structure, and two further metal structures extending on either side of the pair of periodic structures so that each periodic structure lies between the other periodic structure and one of the further metal structures, the arrangement being such that, upon applying suitable potentials to the periodic metal structures and the further metal structures and upon projecting an electron beam in a suitable manner into said space at one end, the beam travels through said space generally in a direction parallel to the lengths of the structures, and with an undulatory motion such that it approaches the two periodic structures in turn"; the specification further discloses that such a device may be incorporated in a travelling wave tube with the two periodic structures forming parts of a slow wave structure along which an electromagnetic wave may be propagated so as to interact with the electron beam. A periodic metal structure is defined as being a series of similar metallic elements which are spaced apart along a given path (the length of the structure) and all of which extend in a similar manner transversely to said path.

According to the present invention, there is provided a travelling wave tube incorporating an electrostatic focussing device in accordance with claim 1 of British patent specification No. 835,350, the tube having a slow wave structure along which an electromagnetic wave may be propagated so as to interact with the electron beam and which is in the form of a single elongated conductor, sections of which constitute the elements of both periodic structures of the focussing device, the conductor being folded so that said elements are joined together end to end in a sequence, alternating between the two periodic structures, which is the same as the sequence in which the elements are arrayed along the length of the space between the periodic structures and the conductor being shaped so that at least the major parts of all said elements are substantially rectilinear and parallel to each other.

It will be appreciated that with such an arrangement the slow wave structure is effectively in the form of a so-called meander line. The present invention thus provides a particularly suitable arrangement for a travelling wave tube adapted to operate as a broad-band forward wave amplifier, since, in general, a slow wave structure in the form of a meander line is relatively non-dispersive (as compared, for example, with a slow wave structure in the form of a pair of ladder-like structures).

One arrangement in accordance with the invention will now be described by way of example with reference to the accompanying drawings, in which.

Figure 1:
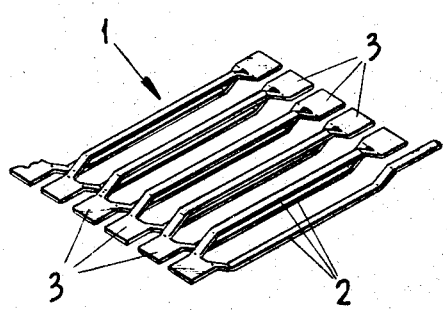
FIGURE 1 is a perspective view of part of the slow wave structure of a travelling wave tube adapted to operate as a broad-band forward wave amplifier.

Referring first particularly to FIGURE 1, the slow wave structure 1 is effectively in the form of a meander line and has an overall length of about 25 centimetres and an overall width of about 2.9 centimetres. The slow wave structure 1 is constituted by a continuous metal strip of thickness 0.4 millimetre which is folded so that it meanders to and fro along the whole length of the structure 1, the main faces of the strip being arranged parallel to the length of the structure 1. The transversely extending sections of the slow wave structure 1 constitute a series of metal elements 2 of equal length which extend perpendicularly with respect to the overall length of the structure 1 with corresponding ends in register, the elements 2 all having a width of 0.8 millimetre and being spaced apart by equal intervals of 1.2 millimetres along the length of the structure 1. The elements 2 are joined together by means of connecting portions 3 of the strip which are approximately square in shape, the connecting portions 3 being arranged alternately at opposite ends of the elements 2 so that the elements 2 are joined together end to end in a sequence which is the same as the sequence in which they are arrayed along the overall length of the slow wave structure 1. The connecting portions 3 all lie in the same plane (ignoring the thickness of these portions 3), but the elements 2 are bent in such a manner that the central portions of one series of alternate elements 2 are offset on one side of this plane and that the central portions of the other series of alternate elements 2 are offset on the other side of this plane. The central portions of the elements 2 are all rectilinear and two centimetres in length and the main faces of all these central portions are disposed parallel to the main faces of the connecting portions 3, the spacing between the central portions of the two series of alternate elements 2 in a direction perpendicular to the main faces of these portions being two millimetres.

Figure 3:
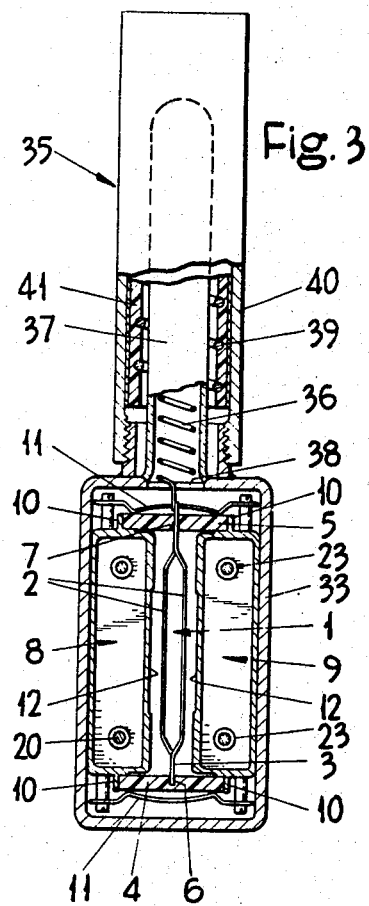
FIGURE 3 is a sectional elevation of the travelling wave tube, the section being taken along the line III—III of FIGURE 2.
Figure 2:
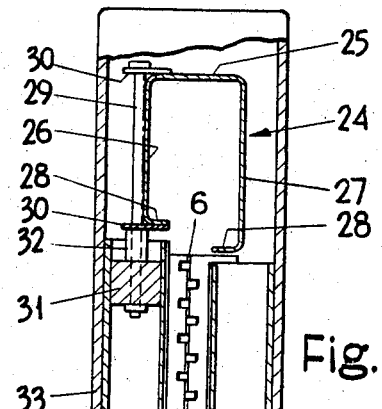
FIGURE 2 is a part sectional side elevation, shown partly broken away, of the travelling wave tube.

Referring now particularly to FIGURES 2 and 3, the slow wave structure 1 is supported between two support strips 4 and 5 of electrically insulating material, for example glass, the strips 4 and 5 being of rectangular cross-section and extending along the whole length of the structure 1; the elements 2 extend between the strips 4 and 5 with the axes of the central portions of the elements 2 perpendicular to the main faces of the strips 4 and 5. Those connecting portions 3 disposed along one side of the structure 1 are firmly fitted in a longitudinal groove 6 centrally formed in the inner main face of the strip 4, while those connecting portions 3 on the other side of the structure 1 are firmly fitted in a longitudinal groove 7 centrally formed in the inner main face of the strip 5.

The travelling wave tube includes means for providing attenuation part way along the length of the slow wave structure 1; such means may take the form of coatings of graphite (not shown) on the relevant parts of the surfaces of the grooves 6 and 7.

Two tubular metal members 8 and 9 of rectangular cross-section are symmetrically arranged on either side of the slow wave structure 1 with the broader walls of the tubular members 8 and 9 parallel to the main faces of the central portions of the elements 2, the members 8 and 9 extending along the length of the slow wave structure 1 and the width of the broad walls of the members 8 and 9 being substantially equal to that of the slow wave structure 1. The ends of the member 9 are respectively in register with the ends of the slow wave structure 1, while one end of the member 8 is in register with the corresponding end of the structure 1 and the other end of the member 8 projects slightly beyond the corresponding end of the structure 1; the element 2 at that end of the structure 1 beyond which the member 8 projects is disposed nearer to the member 8 than to the member 9. The narrow walls of each of the members 8 and 9 are each provided with a central longitudinal outwardly projecting flange 10, and the strips 4 and 5 each fit between one flange 10 of the member 8 and one flange 10 of the member 9, being held in position by means of a number of spring clips 11. The arrangement is such that broad wall of each tubular member 8 or 9 adjacent the slow wave structure 1 is spaced one millimetre from the central portions of the adjacent series of alternate elements 2; a shallow longitudinal recess 12, 14 millimetres wide and 0.3 millimetre deep, is centrally formed in that surface of each of these broader walls which faces the slow wave structure 1.

An electron gun 13 is disposed adjacent that end of the slow wave structure 1 with which the corresponding end of the member 8 is in register, the gun 13 being designed to project a strip-like beam of electrons into the space between the two series of alternate elements 2 so that the beam travels through this space generally in a direction parallel to the length of the structure 1. The gun 13 includes an indirectly heated cathode 14, a beam-forming plate 15 on which the cathode 14 is mounted and to which the cathode 14 is electrically connected, and three anode plates 16, 17 and 18 which are disposed in sequence between the beam-forming plate 15 and the adjacent end of the slow wave structure 1, the plate 15 and the anode plates 16, 17 and 18 being arranged with their main faces perpendicular to the length of the slow wave structure 1. The anode plates 16, 17 and 18 respectively have formed in them three rectangular apertures 19 through which the electron beam passes before emerging from the gun 13 in operation, the long dimensions of the apertures 19 being parallel to the central portions of the elements 2; the apertures 19 are all about 13 millimetres long, but the widths of the apertures 19 decrease progressively from the first anode plate 16 to the final anode plate 18, the aperture 19 in the plate 18 having a width of about one millimetre.

The electron gun 13 and the tubular members 8 and 9 are secured together by means of two pairs of ceramic rods 20 which pass through the plates 15, 16, 17 and 18, each rod 20 being secured at one end to the plate 15. Those ends of one pair of the rods 20 remote from the plate 15 pass through, and are secured to, a metal support block 21 which is secured inside the tubular member 8 adjacent that end of the member 8 nearer the eletron gun 13, while those ends of the other pair of rods 20 remote from the plate 15 pass through, and are secured to, a further metal support block 22 which is secured inside the tubular member 9 adjacent that end of the member 9 nearer the gun 13. The plates 15, 16, 17 and 18 and the blocks 21 and 22 are spaced apart by means of a number of spacing elements 23.

The travelling wave tube also includes a collector electrode 24 which is disposed adjacent that end of the slow wave structure 1 remote from the electron gun 13. The collector electrode 24 includes an end plate 25 which is disposed at right-angles to the length of the slow wave structure 1 and on which the electron beam impinges in operation, and two side plates 26 and 27 which extend from opposite edges of the back plate 25 with their main faces parallel to the broad walls of the members 8 and 9; those ends of the side plates 26 and 27 remote from the back plate 25 are respectively provided with two inwardly projecting flanges 28 and are respectively spaced approximately equal distances from the adjacent ends of the members 8 and 9, the free end of each flange 28 being in register with the inner broad wall of the relevant member 8 or 9. The collector electrode 24 is secured in position relative to the members 8 and 9 by means of a further pair of ceramic rods 29 which pass through two outwardly projecting flanges 30 respectively provided at the ends of the side plate 26 and through a further metal support block 31 secured inside the member 8 adjacent that end of the member 8 remote from the electron gun 13, each rod 29 being secured to the block 31 and to that flange 30 remote from the member 8; the block 31 and the adjacent flange 30 are spaced apart by means of a spacing element 32.

The whole of the assembly described above is mounted in an evacuated tubular metal envelope 33 of rectangular cross-section, those broad walls of the members 8 and 9 remote from the slow wave structure 1 being in contact with the inner faces of the broad walls of the envelope 33, and the support strips 4 and 5 being disposed adjacent the narrow walls of the envelope 33. Direct current electrical connections 34 for the cathode 14, the slow wave structure 1, the collector electrode 24 and the anode plates 16, 17 and 18 are sealed through one of the narrow walls of the envelope 33 adjacent that end of the envelope 33 nearer the electron gun 13.

Input and output radio frequency connectors are respectively provided for those ends of the slow wave structure 1 adjacent and remote from the electron gun 13, each radio frequency connector comprising a conventional helix coupler 35 (only that helix coupler 35 forming the input radio frequency connector being seen). Each helix coupler 35 includes an inner helix 36 one end of which is electrically connected to the free end of the relevant end element 2 of the structure 1, the helix 36 being disposed inside a glass tube 37 which extends perpendicularly from one of the narrow walls of the envelope 33. One end of each glass tube 37 is open and is sealed to the periphery of a circular hole 38 formed in the relevant wall of the envelope 33 adjacent the relevant end of the slow wave structure 1, while the other end of the tube 37 is closed. Each helix coupler 35 includes an outer helix 39 which is disposed around part of the length of the relevant tube 37 and which is in turn surrounded by a circular cylindrical metal member 40, a sleeve 41 of electrically insulating material being interposed between the helix 39 and the cylindrical member 40. The outer helix 39 and the cylindrical member 40 of each coupler 35 are respectively coupled to the inner conductor and the outer conductor of a coaxial line (not shown).

In operation of the travelling wave tube, the tubular metal members 8 and 9 (which are electrically connected to the metal envelope 33) and the cathode 14 are earthed, while appropriate positive potentials are applied to the slow wave structure 1, the collector electrode 24 and the three anode plates 16, 17 and 18. In one typical mode of operation of the travelling wave tube in which a beam current of about 30 milliamperes is passed, the potential applied to the slow wave structure 1 is about 1200 volts, the potential applied to the collector electrode 24 is about 600 volts and the potentials applied to the first, second and final anode plates 16, 17 and 18 are respectively about 25 volts, 500 volts and 1300 volts. It should be understood that the slow wave structure 1, and the tubular metal members 8 and 9 together form an electrostatic focussing device as claimed in British patent specification No. 835,350, the two series of alternate elements 2 of the slow wave structure 1 forming the periodic structures of the focussing device, and those broad walls of the members 8 and 9 adjacent the slow wave structure 1 forming the further metal structures of the device. Thus, the electron beam is focussed electrostatically as it travels along the space defined by the two series of alternate elements 2, the manner in which the electron beam is focussed being as described in the aforesaid specification; the effect of the focussing is that the beam travels along the slow wave structure 1 with an undulatory motion such that it approaches the two series of alternate elements 2 of the structure 1 in turn, one set of alternate peaks of the beam being respectively disposed in the vicinities of the gaps between the elements 2 forming one series of alternate elements, and the other set of alternate peaks of the beam being respectively disposed in the vicinities of the gaps between the elements 2 forming the other series of alternate elements 2.

Also, in operation, a radio frequency input signal is applied to that end of the slow wave structure 1 adjacent the electron gun 13 via the input radio frequency connector so that an electromagnetic wave is propagated along the slow wave structure 1, the wave travelling in the same direction as the general direction of travel of the electron beam. As the wave travels along the slow wave structure 1, it interacts with the electron beam in such a manner that it absorbs energy from the beam with the result that an amplified radio frequency output signal is obtained from the output radio frequency connector.

It is found that, in the travelling wave tube described above, by virtue of the electrostatic focussing effect referred to above, there is no significant dispersion of the electrons of the beam in directions perpendicular to the broad walls of the members 8 and 9 and that a large percentage of the electrons passing through the aperture 19 in the final anode plate 18 are collected by the collector electrode 24. Also, it should be understood that the presence of the shallow recesses 12 in those surfaces of the broad walls of the members 8 and 9 facing the slow wave structure 1 serves to bring about a perturbation in the electrostatic field set up in operation between the slow wave structure 1 and the members 8 and 9 in such a manner as to inhibit lateral dispersion of the beam in directions parallel to the broad walls of the members 8 and 9.

It should be noted that in a travelling wave tube intended to operate as a forward wave amplifier care must be taken to avoid the generation of oscillations by virtue of feedback of radio frequency energy from the output to the input via a wave propogating path separate from the slow wave structure, this point being particularly relevant when using an electrostatic focussing device of the kind concerned in the present case in view of the necessary presence of the further metal structures of the focussing device. This requirement may be met in a travelling wave tube according to the invention by incorporating the further metal structures of the foccusing device as parts of a hollow waveguide which is dimensioned so that its cut-off frequency is above the desired operating frequency range of the tube and which surrounds and extends parallel to the length of the slow wave structure. Thus in the tube described above by way of example the combination of the envelope 33 and the members 8 and 9 effectively constitutes a ridge waveguide, the dimensions of which are so chosen that it has a cut-off frequency of about 2,600 mc./s., the tube being intended to operate at frequencies around 2,000 mc./s. If desired, this arrangement could be modified to provide a waveguide having a higher cut-off frequency by dispensing with the members 8 and 9 and reducing the cross-sectional dimensions of the envelope 33 so that the envelope 33 closely surrounds the slow wave structure 1; in this case, the two broader walls of the envelope 33 would act as the further metal structures of the focusing device.

The travelling wave tube described above is capable, when operated under conditions such as specified above, of providing stable amplification with a gain of at least 20 decibels over a frequency band having a width of 400 mc./s. and centred on a frequency of 2,000 mc./s.

I claim:
1. A travelling wave tube having an evacuated envelope within which are disposed: a slow wave structure in the form of a single elongated conductor which is shaped so as to provide a pair of periodic metal structures whose metal elements are constituted by sections of said conductor, the periodic structures being disposed with their lengths substantially parallel to each other, being separated by a linearly clear space along which an electron beam may travel so as to interact with an electromagnetic wave propagated along the slow wave structure and being disposed so that the gaps in each periodic structure are opposite the elements of the other periodic structure, the conductor being folded so that said elements are joined together end to end in a sequence, alternating between the two periodic structures, which is the same as the sequence in which the elements are arrayed along the length of said space and the conductor being shaped so that at least the major parts of all said elements are substantially rectilinear and parallel to each other; and means for projecting an electron beam longitudinally into said space at one end, the slow wave structure forming part of an electrostatic focussing device for the electron beam which also includes two further metal structures which are electrically insulated from the slow wave structure and which extend respectively on either side of the slow wave structure so that each periodic structure lies between the other periodic structure and one of the further metal structures, whereby in operation, with suitable electrostatic potentials applied to the slow wave structure and the further metal structures such that the further metal structures are negative with respect to the slow wave structure, the electron beam is constrained to travel along said space with an undulatory motion such that it approaches the two periodic structures in turn; and the tube further including radio frequency input and output connectors respectively coupled to those ends of the slow wave structure adjacent and remote from said one end of said space.

2. A travelling wave tube according to claim 1, in which the slow wave structure is surounded by a hollow waveguide which extends parallel to the length of the structure and parts of which constitute the further metal structures of the focussing device, the waveguide being dimensioned so that its cut-off frequency lies above a range of frequencies in which amplification may be obtained of a signal applied to said input connector.

References Cited
UNITED STATES PATENTS 2,973,453   2/1961   Hogg _____ 315—3.5

FOREIGN PATENTS 677,586   8/1952   Great Britain.

HERMAN KARL SAALBACH, *Primary Examiner.*

R. D. COHN, P. L. GENSLER, *Assistant Examiners.*